Jan. 19, 1943. G. J. WEY 2,308,756
WATTHOUR METER MAGNET
Filed Nov. 4, 1939
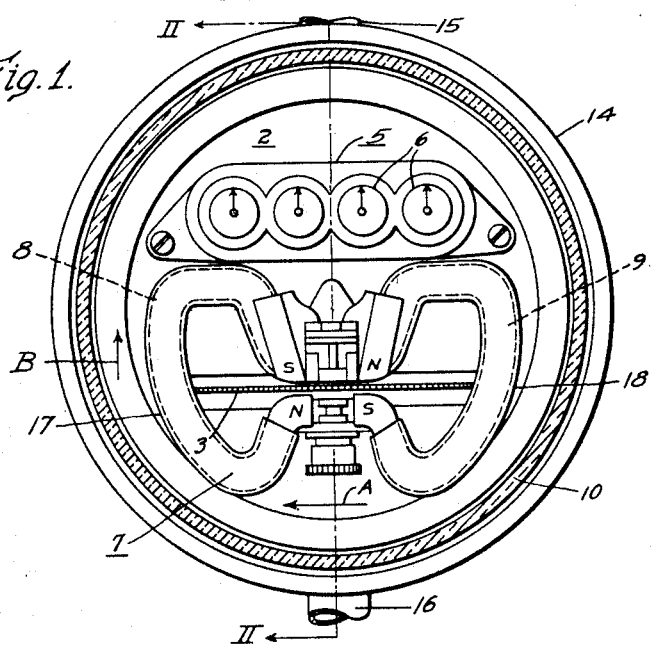
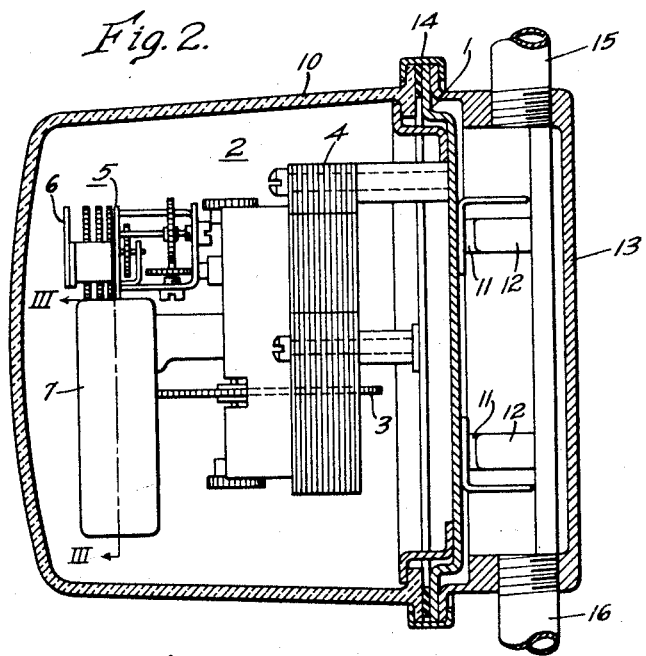
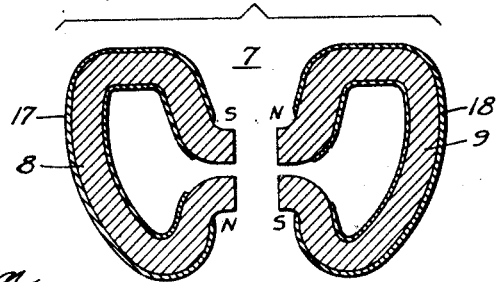
WITNESSES:
C. J. Weller.
C. L. Friedman.
INVENTOR
George J. Wey.
BY
ATTORNEY Patented Jan. 19, 1943

2,308,756

UNITED STATES PATENT OFFICE 2,308,756

WATT-HOUR METER MAGNET

George J. Wey, East Orange, N. J., assignor to Westinghouse Electric & Manufacturing Company, East Pittsburgh, Pa., a corporation of Pennsylvania Application November 4, 1939, Serial No. 302,881

4 Claims. (Cl. 171—264)

This invention relates to damping magnets for measuring instruments, and it has particular relation to damping magnets for measuring instruments subject to electrical surge conditions.

In numerous electrical instruments, damping magnets are employed for providing a braking force or torque. As an example of such an instrument, reference may be made to the well-known watthour meter in which an electro-conductive armature is rotated by means of a shifting electrical field produced by an electromagnet. This electromagnet is energized from a circuit in accordance with the voltage and current thereof to produce a torque on the watthour meter armature in proportion to the load on the circuit. If no provision for damping were made, the rate of rotation of the armature would be restricted only by the friction of the rotating parts of the armature and the register driven thereby. Consequently, the armature would rotate at an excessive speed regardless of the magnitude of the load to be measured.

In order to control the rate of rotation of the armature, a damping magnet is provided for establishing a magnetic field across a portion of the path through which the armature rotates. As the armature rotates, eddy currents are induced therein by the magnetic field and these eddy currents coact with the magnetic field to provide a braking torque for the armature. The braking torque increases with the rate of rotation of the armature and provides a linear relationship between the rate of rotation and the load in the circuit to be measured.

The braking torque produced by a damping magnet varies in accordance with the square of the flux density in the magnetic field established by the damping magnet. Consequently, if accurate measurements are desired, it is important that a damping magnet be employed which is not affected by external conditions or by age.

Among the magnet steels employed for permanent damping magnets, tungsten and chrome magnet steels are most widely employed. These magnet steels when properly treated provide magnetic fields which are substantially unaffected by ageing over long periods of time. If a watthour meter provided with such a magnet is placed in service in a locality wherein it is not subject to varying external conditions, the watthour meter will measure power accurately without attention over a long period of years.

In many applications, however, watthour meters are subjected to external conditions which tend to affect the characteristics of permanent damping magnets. A condition often encountered is that in which the permanent magnet is subjected to an external magnetic field which may tend to demagnetize the damping magnet. If the external magnetic field is continuous, the damping magnet may be shielded with reasonably satisfactory results by means of a magnetic enclosure. Furthermore, if the external magnetic field is continuous, the effects thereof on the damping magnet may be compensated for by suitable adjustments of the damping magnet.

In the case of a fluctuating external magnetic field, however, a magnetic shield is not a satisfactory solution. Apart from the excessive weight and dimensions of such shields, the protection afforded thereby against fluctuating fields is inadequate.

Most of the fluctuating magnetic fields which are encountered in practice are produced by electrical currents having steep wave fronts. The cycle of such a current may be represented as a matter of microseconds. Such currents may be produced by short circuits which result in an unusually heavy flow of current through the current coils of a watthour meter prior to operation of a protective device, or by transient currents produced near the meter housing in any manner.

Damping magnets having high coercive forces, such as cobalt steel magnets, have shorter lengths exposed to these external fields, and this, together with their high coercive forces, results in a slightly higher resistance to changes caused by transient external fields. However, such damping magnets are objectionable from other standpoints, such as cost. Furthermore, high coercive magnet steels often are difficult to adjust and handle, and often do not provide as stable a magnetic field as the tungsten and chrome steels. Consequently, it is desirable to provide the tungsten and chrome steels with suitable protection against these external fields.

In accordance with my invention, a damping magnet is provided with an electro-conductive shield for protection against fields produced by transient currents. In one embodiment of my invention, a shield of copper is formed directly on the damping magnet to a thickness sufficient to protect it. When a transient magnetic field is applied to a damping magnet protected by such a shield, eddy currents are set up in the copper shield which oppose the transient current producing the magnetic field. Consequently, with a suitable thickness of the copper shield, the damping magnet is not affected by the fields produced by such transient currents.

Although the copper shield may be applied to a damping magnet in several ways, I prefer to apply such a shield by electro-deposition. The reasons for this preference will be explained below.

It is, therefore, an object of my invention to provide a damping magnet for measuring instruments which is not affected by transient magnetic fields.

It is a further object of my invention to provide a damping magnet provided with a shield effective against transient magnetic fields.

It is another object of my invention to provide chrome and tungsten magnets with a copper shield formed directly thereon.

It is a still further object of my invention to provide a damping magnet for measuring instruments with an electro-deposited, electro-conductive shield.

Other objects of my invention will be apparent from the following description taken in conjunction with the accompanying drawing, in which:

Figure 1 is a view in front elevation with the cover shown in section of a watthour meter embodying my invention;

Fig. 2 is a view in section taken along the line II—II of Fig. 1; and

Fig. 3 is a view in section of a damping magnet assembly embodying my invention taken along the line III—III of Fig. 2.

Referring to the drawing, Figs. 1 and 2 show a watthour meter of the well-known detachable type disclosed, for example, in the Bradshaw et al. Patent No. 1,969,499. In this construction, a base plate 1 is provided for supporting a watthour meter mechanism 2. This mechanism includes a rotatable armature which generally is constructed in the form of a disc of aluminum or copper. For rotating this armature, an electromagnet 4 is provided which is energized in a manner well known in the art to produce a shifting magnetic field across the armature 3. The torque exerted by the electromagnet 4 on the armature 3 is controlled in accordance with the load of an electric circuit to be measured. Rotation of the armature 3 is employed for indicating or recording the electrical load to be measured. In the specific embodiment illustrated, a register 5 is provided which is geared to the rotatable armature 3 for indicating on dials 6 the watts consumed by the load.

In order to provide a damping torque for the armature 3, a damping magnet assembly 7 is mounted adjacent the armature for providing a magnetic field thereacross. As illustrated, the damping magnet assembly comprises two permanent magnets 8 and 9 having their poles positioned as indicated in Fig. 1, wherein the reference character S designates a south pole and the reference character N designates a north pole.

The entire meter mechanism is protected by a cover 10 which is detachably secured to the base plate 1. In the detachable construction, the watthour meter is provided with a plurality of contact blades 11 which project from the base plate 1 and are received detachably in contact jaws 12 mounted in a socket 13. If desired, a sealing ring 14 may be provided for securing the cover 10 and base plate 1 to the socket 13. Electrical connections for the watthour meter may be brought into the socket 13 through conduits 15 and 16. In some installations, the conduits 15 and 16 are mounted horizontally, but for purpose of illustration they are shown mounted vertically in Fig. 2. Further details of the exact construction of the watthour meter illustrated in Figs. 1 and 2 may be obtained by reference to the aforesaid Bradshaw patent.

By reference to Fig. 1, it will be noted that when an external magnetic field is applied in any direction in the vicinity of the permanent magnets 8 and 9, a demagnetizing action will result. For example, if a magnetic field is applied in the direction of the arrow A of Fig. 1, the magnetic field will tend to demagnetize the lower poles of the magnets 8 and 9. As a further example, if a magnetic field is applied in the direction of the arrow B in Fig. 1, a demagnetizing action will be applied to the poles of the magnet 9. In a similar manner, it can be shown that magnetic fields extending in other directions will tend to demagnetize certain of the poles of the permanent magnets 8 and 9.

As above indicated, if the external magnetic fields represented by the arrows A and B are continuous in nature, a correction may be effected by suitable compensation of the permanent magnet assembly. Furthermore, protection from a continuous magnetic field may be provided by enclosing the permanent magnets 8 and 9 in a magnetic housing.

On the other hand, if a transient external magnetic field occurs in the vicinity of the permanent magnets 8 and 9, a demagnetization results which cannot be compensated for by adjustment of the permanent magnet assembly. Moreover, in such a case, a magnetic shield does not provide an efficient protection of the permanent magnets.

For protection against such transient magnetic fields, I provide the permanent magnets 8 and 9 with copper coats or shields 17 and 18. When a transient magnetic field is produced by a transient current in the vicinity of the permanent magnets 8 and 9, eddy currents are induced in the copper shields 17 and 18 which tend to oppose changes in the external magnetic fields.

Copper coatings have been proposed for protecting iron and steel against corrosion, but such coatings generally are extremely thin, or flash coatings. These flash coatings do not have a thickness sufficient for protecting the permanent magnets 8 and 9. As a rule, such coatings are thinner than .001 of an inch. For protecting the permanent magnets 8 and 9, I have found it desirable to employ coatings in excess of .001 of an inch, and preferably within the range of .008 to .020 of an inch. A copper shield having an average thickness of .015 of an inch has been found entirely satisfactory for most conditions encountered by watthour meters.

Numerous methods are available for applying copper to iron or steel. For example, copper may be wrapped around the steel and soldered, if desired, to form continuous electrical paths surrounding the permanent magnets. Such a method is, of course, slow, tedious and expensive. Another method is that known as the Schoop metal spray method, wherein molten copper is sprayed directly against the surface to be coated, but the resulting coating is too thin for present purposes. A still further method is that of casting, in which copper may be cast directly around the permanent magnet.

The methods mentioned in the foregoing paragraph are less preferable than electro-deposition. A fabricating procedure involves manufacturing difficulties and does not produce as uniform a product. The Schoop metal spray procedure does not provide as compact a copper deposition as could be desired, and the casting of a shield directly around the permanent magnet requires temperatures which may affect the magnetic and physical properties of the permanent magnet.

Preferably, after being formed and treated a permanent magnet is cleaned in any conventional manner and pickled, as by dipping in sulphuric acid or hydrochloric acid, before immersion in a copper plating bath. The permanent magnet then is connected as an electrode in the copper plating bath until a plating of the desired thickness is formed thereon.

The rate of electro-deposition may be increased somewhat by increasing the temperature of the bath. When this is done, a second desirable result is obtained in that the permanent magnet is aged at the same time that the copper coating is formed thereon. For example, if a copper coating is formed on the permanent magnet in an electro-plating bath operating at a temperature of 175° F. for several hours, the permanent magnet will emerge from the bath not only with an adequate copper coating thereon, but with its magnetic properties so modified that substantially no further change in magnetic properties will result.

In addition to ageing the permanent magnet and forming a shield for the permanent magnet, electro-plating also results in protection for the permanent magnet against corrosion. It will be noted that the permanent magnet is placed in the electroplating bath in a clean condition and emerges therefrom with a copper plating directly on the body of the magnet. Consequently, no corrosion of the permanent magnet can take place.

If desired, the permanent magnets 8 and 9 may be copper plated over their entire surfaces, and the copper plating then may be removed between the pole ends, in order to provide a gap between the armature 3, by suitable machining operations. However, it has been found that the omission of the copper coating from these pole ends does not appreciably diminish the shielding properties of the coating. Consequently, a suitable resist material may be placed on the pole ends prior to electroplating in order to prevent the deposition of copper thereon. For example, the pole ends S and N, which are to be left bare as illustrated in Fig. 3, may be initially coated with a mask or resistant material, such as rubber, wax or asphalt before immersion in the electroplating bath. After completion of the electroplating operation, the resistant material may be removed in any conventional manner.

Copper is peculiarly suitable for shielding purposes for a number of reasons. Because of its high conductivity and compact structure, it offers high resistance to penetration by magnetic fields. Thus with a thickness of only .015 of an inch, adequate protection is afforded to a permanent magnet formed from any desired permanent magnet material against most conditions encountered in the field. Furthermore, since copper is inherently non-corrosive, and since it may be plated directly on the permanent magnet steel, it forms an excellent protective medium therefor. In watthour meters, parts are placed very closely together and space is at a premium. Since the copper coating does not add appreciably to the size of the permanent magnets, it offers substantially no difficulties to the insertion of the plated magnets in watthour meter assemblies of standard design. Moreover, the permanent magnets may be employed with substantially the same fittings previously employed in the art.

In place of copper, it is possible to employ certain other materials, such as silver. In this case, however, the cost of a protective coating would be too great for most applications.

Although I have described my invention with reference to certain specific embodiments thereof, it is obvious that numerous modifications thereof are possible. Therefore, I do not wish my invention to be restricted except as required by the appended claims when interpreted in view of the prior art.

I claim as my invention:

1. In a watthour meter having an electro-conductive armature mounted for rotation and means responsive to a variable quantity for rotating said armature, a permanent damping magnet for establishing a magnetic field for said armature whereby rotation of said armature develops a braking torque for controlling the rate of rotation thereof, and means for protecting said permanent damping magnet from a fluctuating magnetic field produced by a transient current near said meter comprising an electrodeposited copper shield surrounding a substantial portion of said permanent magnet, said shield having a thickness sufficient for limiting the penetration of said fluctuating magnetic field substantially to said shield.

2. In an instrument having an electro-conductive armature mounted for rotation and means responsive to a variable quantity for rotating said armature, a permanent damping magnet for establishing a magnetic field for said armature whereby rotation of said armature develops a braking torque for controlling the rate of rotation thereof, and means for protecting said permanent damping magnet from fluctuating magnetic fields comprising an electrodeposited electro-conductive shield surrounding a substantial portion of said permanent magnet, said shield being constructed substantially of copper directly in contact with said permanent damping magnet and conforming in contour thereto, and having a thickness in excess of one-thousandth of an inch.

3. In a measuring instrument having an electro-conductive armature, a permanent magnetic assembly including a permanent magnet having pole portions positioned adjacent said electro-conductive armature for establishing a magnetic field therefor, and an electrodeposited copper shield covering substantially all of said permanent magnet except said pole portions, said copper shield having a thickness sufficient for shielding said permanent magnet from a fluctuating magnetic field.

4. A permanent magnet for a measuring instrument having a coating of electro-deposited copper on a substantial portion thereof, said copper coating having a thickness in excess of seven-thousandths of an inch.

GEORGE J. WEY.